April 8, 1958 C. OATES, JR 2,829,505
SYSTEMS FOR PREVENTING ICE FORMATION
Filed April 27, 1955 2 Sheets-Sheet 2
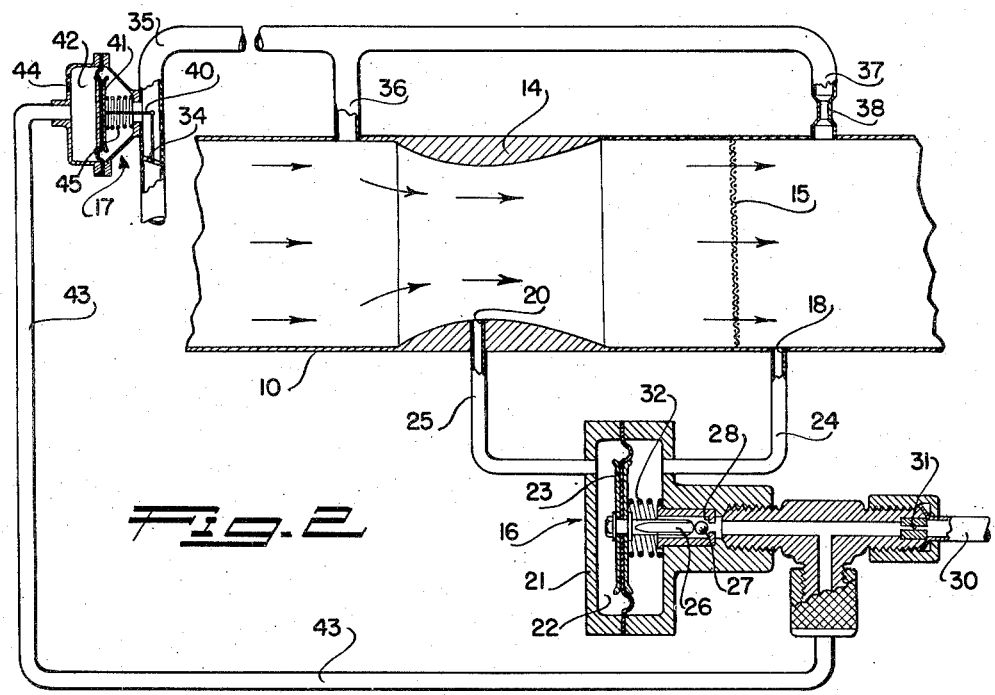
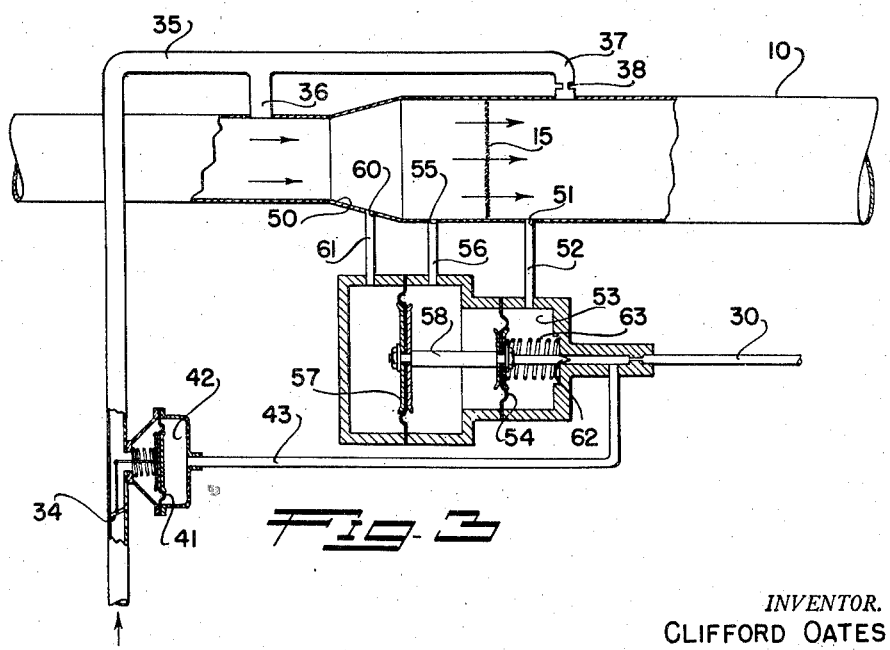
INVENTOR.
CLIFFORD OATES JR.
BY
*George C. Sullivan*
Agent United States Patent Office 2,829,505
Patented Apr. 8, 1958

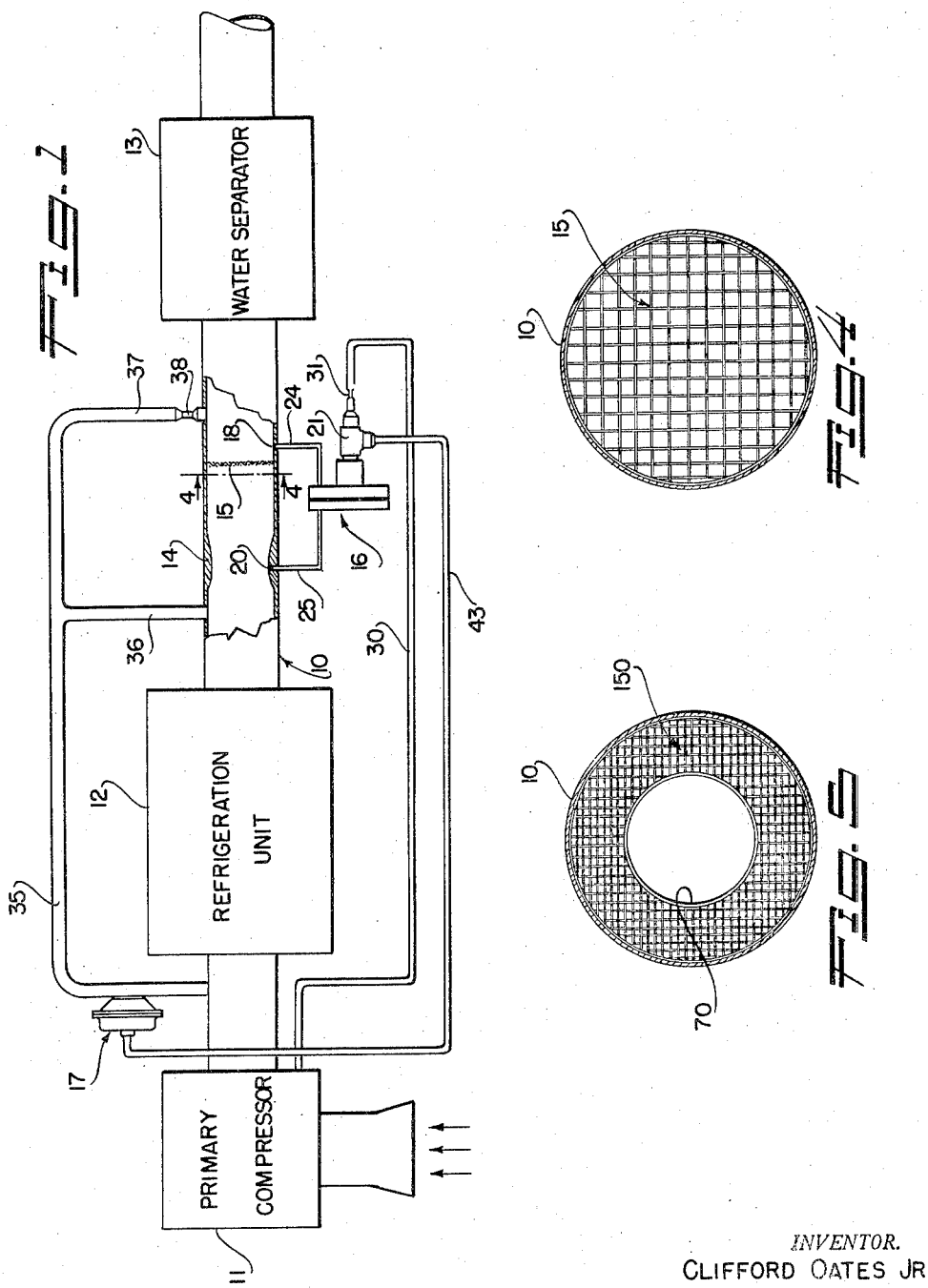

2,829,505

SYSTEMS FOR PREVENTING ICE FORMATION

Clifford Oates, Jr., North Hollywood, Calif., assignor to Lockheed Aircraft Corporation, Burbank, Calif.

Application April 27, 1955, Serial No. 504,268

12 Claims. (Cl. 62—6)

This invention relates to systems and devices for preventing the detrimental formation of ice in ducts and in other apparatus and relates more particularly to such systems for controlling or preventing the formation of ice in aircraft equipment such as the air ducts of airplane air conditioning systems.

The air conditioning systems of aircraft embody refrigerators or coolers for the air supplied to the personnel or passenger compartments as well as means for introducing heated air into the system, water separator means, etc. all governed by or responsive to control mechanisms. Since the airplanes operate under widely varying conditions of ambient temperature, humidity, etc. it has been found difficult to provide controls that function properly under actual service conditions. For example, the means for preventing the formation of ice in the air conditioning systems are usually under the control of temperature sensitive probes extending into the air duct, designed to function at an air temperature above the freezing temperature of water, say at 35° F. to cause opening of a valve for admitting heated air to the duct system. Such temperature responsive arrangements do not regulate the air temperature in a satisfactory manner and frequently either cause excessively high air temperatures in the duct system which penalize the refrigeration system capacity or bring about icing conditions which may damage the equipment and/or cause the entrainment of an excessive quantity of moisture in the air. While the present invention is not to be considered as restricted for use in such air conditioning apparatus, it is well adapted for such applications and an object of the invention is to provide a simple, practical and effective control system useful with the air conditioning apparatus of aircraft and which obviates the difficulties encountered in the prior icing prevention systems.

Another object of the invention is to provide an icing prevention system of this character that serves to automatically sense true icing conditions in the discharge air flow of an air conditioning system such as an air-cycle refrigeration apparatus and operates in response to such icing conditions to introduce heated air into the duct or air flow to prevent the detrimental formation of ice in downstream equipment.

Another object of the invention is to provide a system of the class described characterized by a novel arrangement of a screen spaced downstream in the duct from either a venturi or divergent duct region so that if moisture is present in the air and the temperature is below 32° F. ice will collect on the screen to alter the pressure relationship in pressure taps leading from adjacent the screen and from the venturi or said region to a pressure sensitive mechanism which, in turn, is operable to control the introduction of heated air to the duct. Since this combination or arrangement is directly responsive to actual icing, it is more dependable, accurate and sensitive than the temperature sensitive devices previously employed.

A still further object of the invention is to provide a system of this kind in which the icing responsive means and the pressure sensitive means associated therewith serve under icing conditions in the duct to cause the introduction of heated air to the duct at a point upstream from the venturi or divergent duct region and a metered flow of heated air into the duct downstream from the screen, the latter heated air serving to avoid or eliminate ice in the water separator and thereby avoid injury to the equipment.

Other objectives and features of the invention will become apparent from the following detailed description of typical preferred forms and applications of the invention illustrated in the accompanying drawings, in which;

Figure 1 is a digrammatic view of an air conditioning system incorporating one form of icing prevention means of the invention;

Figure 2 is an enlarged diagrammatic longitudinal sectional view of the ice prevention arrangement illustrated in Figure 1;

Figure 3 is a view similar to Figure 2 illustrating another system or arrangement of the invention;

Figure 4 is an enlarged transverse sectional view taken substantially as indicated by line 4—4 on Figure 1 illustrating the screen; and Figure 5 is a view similar to Figure 4 illustrating a different type of screen that may be incorporated in the systems of the invention.

The systems of the invention may be used in association or combination with air conditioning apparatus, and the like, of various configurations and types. In the drawings I have shown a simple aircraft air conditioning system including a main air duct 10. Duct 10 receives air from a primary compressor 11 which, in practice, may be a jet engine or turbo-jet engine compressor tap or compressed air bleed. The air from the primary compressor 11 is warm or heated and passes through a refrigeration unit 12 of any required type, for example the unit 12 may be an air cycle refrigeration machine. A water separator 13 of selected or required construction is interposed in the duct 10 downstream from the refrigeration unit 12 to remove excess moisture or water from the air prior to discharging into the pilot or passenger compartment of the airplane.

The system of the invention as illustrated in Figures 1 and 2 of the drawings includes, generally, a venturi 14 and a screen 15 in the duct 10 between the refrigeration unit 12 and the water separator 13, a pressure sensitive means 16 responsive to the air pressure relationship at the venturi 14 and a point downstream from the screen 15, and a valve and air supply line means 17 controllable by the pressure sensitive means 16 to introduce heated air into the duct 10 to correct or avoid icing in the air conditioning system.

The venturi 14 is provided in the main air duct 10 downstream from the refrigeration unit 12 while the screen 15 is spaced from the venturi. Although the screen 15 may be spaced either upstream or downstream from the venturi, the illustrative form of the invention shown in the drawings has the screen spaced downstream from the venturi. The screen 15, which may be a simple, relatively coarse screen of any selected material such as wire, normally offers a minimum of resistance to air flow through the duct but is effective in collecting ice when the temperature and moisture conditions are conducive to ice formation. Figure 4 shows the screen 15 in the duct 10 and illustrates the screen extending completely through or across the duct. The screen 15 is preferably provided in a uniform diameter region of the duct 10 whereas the throat of the venturi 14 constitutes a region of increased velocity and decreased pressure. A pressure tap 18 is provided to receive static duct pressure adjacent but downstream from the screen 15 and a similar pressure tap 20 is arranged to receive the venturi throat pressure.

The pressure sensitive means 16 may be any selected unit or mechanism sensitive to the air pressures at the taps 18 and 20 and operable in response to any appreciable change in the pressure relationship due to measurable variations in the pressure drop across the screen 15 to control the means 17. In the simple form of the invention illustrated the pressure sensitive means 16 is a diaphragm-valve unit comprising a casing 21 having a chamber 22 and a diaphragm 23 extending across the chamber. A line or pipe 24 extends from the static pressure tap 18 to one side of the chamber 22 and a similar pipe 25 extends from the venturi throat tap 20 to the other side of the chamber so that static duct pressure from a point downstream of the screen 15 acts on one side of the diaphragm 23 and venturi throat pressure acts on the other side of the diaphragm. The diaphragm 23 carries a stem 26 which cooperates with a valve ball 27 arranged at a valve seat or orifice 28. The valve ball 27 cooperates with the seat 28 to control the flow or delivery of air under pressure from a line 30 to the diaphragm chamber 42. The line 30 may extend to the primary compressor 11 or any other available or selected source of actuating air under pressure. An orifice 31 upstream from the valve seat 28 meters the actuating air pressure to the valve.

The venturi 14 is so proportioned that the difference between the venturi throat pressure sensed at tap 20 and the duct static pressure is equal to the pressure drop across the screen 15. Accordingly, the venturi throat pressure is normally equal to the static pressure downstream from the screen 15 as sensed at the tap 18. Thus the pipes 24 and 25 conduct substantially equal pressures to the opposite sides of the diaphragm 23 under normal operating conditions. A spring 32 is provided to bias the diaphragm 23 to a position where the valve ball 27 is unseated from the seat 28. The formation or accumulation of any appreciable amount of ice on the screen 15 increases the pressure drop across the screen causing the air pressure in the duct 10 downstream from the screen to decrease with respect to the pressure at the venturi throat. Therefore, the pressure supplied to the opposite sides of the diaphragm 23 are unbalanced to a degree sufficient to overcome the action of the biasing spring 32 and the servo valve or ball 27 is closed against its seat 28. When this occurs the actuating air pressure which previously bled past the valve ball 27 is caused to build up downstream from the orifice 31 to actuate the means 17.

The means 17 includes a valve 34 controlling a pipe or line 35 carrying warm or heated air under pressure. As best illustrated in Figure 1, the line 35 may receive its warm air under pressure from the primary compressor 11 or from the duct 10 at a point upstream from the refrigeration unit 12. In accordance with the invention the heated or warm air line 35 is branched to have a main discharge branch 36 communicate with the duct 10 adjacent and upstream from the venturi 14 and a second arm or branch 37 which discharges into the duct downstream from the screen 15. This second branch 37 is provided with a flow metering orifice or restriction 38. The above mentioned valve 34 is arranged upstream from the branches 36 and 37 of the line 35 and may be a butterfly valve, or the equivalent, equipped with operating linkage 40 connected with a diaphragm 41. The diaphragm 41 is arranged in a chamber 42 and a line 43 is provided to conduct actuating air pressure to the chamber. The line 43 connects with the above described actuating air supply line 30 at a point between the orifice 31 and the valve seat 28, as shown in Figure 2. Accordingly, when the valve ball 27 closes against the seat 28 as a result of ice forming on the screen 15, air pressure builds up in the line 43 to actuate the diaphragm 41 of the means 17. The diaphragm 41 in turn opens the valve 34 through the medium of the linkage 40 and heated air is permitted to discharge through the pipe branches 36 and 37 into the duct 10. The diaphragm chamber 42 of the means 17 may have a fixed bleed 44 to the atmosphere. It will be seen that the introduction of heated air into the duct 10 from the pipe branch 36 raises the temperature of the main air conditioning airstream and as a consequence removes or halts the formation of the ice on the screen 15. The hot or warm air discharged into the main air duct 10 through the branch 37 at a region downstream from the screen 15 prevents any appreciable freezing or ice formation in the equipment downstream from the screen, notably in the water separator 13. Thus relatively high temperature air is admitted to the duct 10 not only upstream from the screen 15 to raise the overall temperature of the main air stream and prevent further ice collection on the screen but also downstream from the screen in a metered flow sufficient to prevent damaging icing in the water separator and other apparatus. When the ice on the screen 15 has been removed or partially removed to a stable condition by the action just described, the pressures at the pressure taps 20 and 18 are restored to their normal relationship and the diaphragm 23 of the means 16 returns to the position where the valve ball 27 is unseated from the seat 28 thus relieving actuating pressure from the diaphragm 41 of the means 17 so that the valve 34 is closed under the action of a spring 45 associated with the diaphragm and valve linkage.

Figure 3 illustrates a form of the invention including the line 35 carrying the heated air and having the two arms or branches 36 and 37 for supplying the heated air to the duct 10 at longitudinally spaced points or regions. The branch 37, provided with the restriction 38, connects with the duct 10 at a point spaced downstream from the screen 15 as in the previously described form of the invention. The hot air line 35 is controlled by the valve 34 operated by the diaphragm 41 arranged in the chamber 42 and the pipe 43 connects the diaphragm chamber 42 with the operating pressure line 30 at a point downstream from the restriction 31, all substantially as described above. In this form of the invention a divergent region or diffuser 50 is provided in the duct 10 and is spaced along the duct from the screen 15. It will be observed in Figure 3 that the screen 15 is arranged in the continuing portion of the duct 10 which is of uniform diameter and which leads from the diffuser region 50 to the water separator 13, or the like. A static pressure tap 51 is provided in the duct 10 downstream from the screen 15 and a pipe 52 leads therefrom to one end of a diaphragm chamber 53. The pressure from the tap 51 acts on one side of a diaphragm 54 extending across the chamber 53. A second pressure tap 55 communicates with the duct 10 at a point downstream from the divergent region 50, that is at a point spaced between the diffuser 50 and the screen 15, and a pipe 56 leads from the tap 55 to the chamber 53 so that pressure from the tap acts on the other side of the diaphragm 54. Thus the diaphragm 54 is sensitive to the pressure drop across the screen 15. A second diaphragm 57 of larger effective diameter is provided in the chamber 53 and is operatively connected with the first diaphragm 54 by a stem 58. The pressure from the tap 55 acts on one side of this larger diaphragm 57. A pressure tap 60 is provided in the divergent region 50 of the duct 10 and a pipe 61 leads therefrom to the chamber 53 so that pressure from the tap 60 acts on the other side of the diaphragm 57. Thus the diaphragm 57 is sensitive to the pressure differential at the diffuser 50, where the cross-sectional area of the duct 10 gradually increases to convert some of the kinetic energy of the airstream to pressure energy, and the uniform diameter region of the duct downstream therefrom. The dual diaphragm means controls or operates a valve 62 controlling communication of the air pressure line 30 with the diaphragm chamber 53. A spring 63 urges the valve 62 to the open position.

The differential pressures acting on the diaphragms 54 and 57 under normal un-iced operation conditions together with the spring 63 hold the valve 62 open so that insufficient pressure builds up between the restriction 31 and the diaphragm 41 to open the hot air valve 34 of the pipe 35. However if and when ice forms or collects on the screen 15 the pressure drop across the screen increases and this change is sensed at the pressure taps 51 and 55, the pressure at the tap 51 being relatively or proportionately less than theretofore. As a result of this, the dual diaphragm means 54—57 moves the valve 62 to the closed position. This in turn causes opening of the valve 34 in the line 35 and heated air is admitted to the main duct 10 by the pipe branches 36 and 37 to increase the temperature of the air conditioning air. As in the previously described form of the invention the pipe branch 37 admits air to the duct 10 downstream from the screen 15 in a metered amount sufficient to avoid damaging icing of the water separator 13 and other equipment downstream from the screen 15. When conditions in the duct 10 are restored to normal or a stable condition and the screen 15 is free or substantially free of ice, the pressures sensed at the taps 51, 55 and 60 are restored to the normal or stable relationships and the dual diaphragms 54 and 57, assisted by the spring 63, return the valve 62 to the open or air bleeding position to permit closing of the heated air valve 34.

While the invention contemplates the employment of grids, screens, or the like, of selected materials and configurations and is not to be considered as restricted to the use of any particular screen, I have shown in Figure 5 another form of screen 150 that may be employed in the duct 10. This screen 150, which may be used in place of the screen 15, is annular, being secured at its periphery to the wall of the duct 10 and having a central opening 70. The annular screen 150, which may be of finer mesh than the screen 15, may provide pressure drop conditions comparable to those provided by the disc-shaped screen 15 under un-iced conditions and iced conditions or may be designed to produce a greater or lesser pressure drop as the particular installation may require.

Having described only typical forms of the invention I do not wish to be limited to the specific details herein set forth, but wish to reserve to myself any variations or modifications that may appear to those skilled in the art and fall within the scope of the following claims.

I claim:

1. Means for controlling icing conditions in a moving air stream comprising a duct carrying the air stream, a member in the duct producing a pressure drop in said stream and adapted to accumulate ice under icing conditions to increase said pressure drop, means spaced along the duct from the member providing a change in the effective cross-sectional area of the duct, a system for introducing heated air into the duct system including a valve for controlling such introduction, means sensing the pressure in the duct downstream of said member and the pressure in the duct at the first named means, and means sensitive to the pressures thus sensed for operating said valve.

2. A system for controlling icing conditions in a moving air stream comprising a duct carrying the air stream, an ice accumulating member in the duct producing a pressure drop in said stream, means spaced along the duct from the member providing a change in the cross-sectional area of the duct, a line for introducing relatively high temperature air into the duct to correct icing conditions, a valve controlling said line, pressure taps in the duct sensing the pressure downstream from the member and the pressure at said means, and means responsive to the pressures thus sensed for operating said valve.

3. A system for controlling icing conditions in a moving air stream comprising a duct for the air stream, an ice accumulating member in the duct causing a pressure drop in said stream, means spaced along the duct from the member providing a change in the cross-sectional area of the duct, a line for introducing relatively high temperature air into the duct upstream from the member to correct icing conditions, a valve controlling said line, means sensing the pressure in the duct at the downstream side of the member and the pressure at said means, and means responsive to the pressures thus sensed for operating said valve.

4. A system for controlling icing conditions in a moving air stream comprising, a duct for the air stream, an ice accumulating screen in the duct, means spaced along the duct from the screen providing a change in the cross-sectional area of the duct, a line for introducing relatively high temperature air into the duct to correct icing conditions, a valve controlling said line, pressure taps in the duct sensing the pressure at the downstream side of the screen and the pressure at said means, and means responsive to the pressures thus sensed for operating said valve including an actuating pressure system for said valve, a servo valve controlling the actuating pressure system, and means actuated by the pressures from said taps to operate the servo valve.

5. A system for controlling icing conditions in a moving air stream comprising a duct for carrying said air stream, an ice accumulating screen in the duct, means spaced along the duct from the screen providing a change in the cross-sectional area of the duct, a line for introducing relatively high temperature air into the duct to correct icing conditions, said line having branches discharging into the duct at points upstream and downstream of the screen, a valve controlling said line, pressure taps in the duct sensing the pressure at the downstream side of the screen and the pressure at said means, and means responsive to the pressures thus sensed for operating said valve.

6. A system for controlling icing in a moving air stream comprising a duct carrying said air stream, an ice accumulating screen in the duct, a venturi restriction spaced along the duct from the screen, conduit means for introducing relatively high temperature air into the duct, valve means controlling said conduit means, pressure taps sensing air pressures in the duct at the venturi and screen, and means responsive to the pressures thus sensed for operating said valve means.

7. A system for controlling icing in a moving air stream comprising a duct for conducting said stream, an ice accumulating screen in the duct, a venturi restriction spaced along the duct from the screen, conduit means for introducing relatively high temperature air into the duct, valve means controlling said conduit means, pressure taps receiving pressures from the duct at said venturi and downstream of the screen, and means responsive to the pressures thus received for operating said valve means.

8. A system for controlling icing in a moving air stream comprising a duct for conducting said stream, an ice accumulating screen in the duct, a venturi restriction spaced upstream from the screen, conduit means for introducing relatively high temperature air into the duct, valve means controlling said conduit means, pressure taps receiving pressures from the duct at said venturi and downstream of the screen, a mechanism for actuating the valve means, and a diaphragm unit responsive to said pressures for controlling said mechanism.

9. A system for controlling icing in a moving air stream comprising a duct for carrying said stream, an ice accumulating screen in the duct, a venturi restriction spaced upstream from the screen, conduit means for introducing relatively high temperature air into the duct, said conduit means including branches discharging into the duct upstream and downstream of the screen, valve means controlling said conduit means, pressure taps sensing air pressures in the duct at the venturi and screen, and means responsive to the pressures thus sensed for operating said valve means.

10. A system for controlling icing in a moving air stream comprising a duct for carrying said stream, an ice accumulating screen in the duct, a divergent region in the duct spaced along the duct from the screen, conduit means for introducing relatively high temperature air into the duct, valve means controlling the conduit means, pressure taps receiving pressures from the duct at said region and downstream from the screen, and means responsive to the pressures thus received for operating the valve means.

11. A system for controlling icing in a moving air stream comprising a duct for the air stream, an ice accumulating screen in the duct, a divergent region in the duct spaced along the duct from the screen, conduit means for introducing relatively high temperature air into the duct at points upstream and downstream of the screen, valve means controlling the conduit means, pressure taps receiving pressures from the duct at said region and downstream from the screen, and a unit responsive to the pressures thus received for operating the valve means.

12. A system for controlling icing in a moving air stream comprising a duct for the air stream, an ice accumulating screen in the duct, a divergent region in the duct spaced upstream from the screen, conduit means for introducing relatively high temperature air into the duct, valve means controlling the conduit means, pressure taps receiving pressures from the duct at said region and downstream from the screen, and diaphragm means actuated by said pressures to control the valve means.

References Cited in the file of this patent
UNITED STATES PATENTS

| | | |
|---|---|---|
| 2,474,441 | Sparrow | June 28, 1949 |
| 2,562,918 | Hynes | Aug. 7, 1951 |
| 2,632,307 | Massey et al. | Mar. 24, 1953 |
| 2,654,580 | Shaw | Oct. 6, 1953 |